United States Patent [19]
Bingham et al.

[11] Patent Number: 6,052,341
[45] Date of Patent: Apr. 18, 2000

[54] DEVICE ELEMENT ALLOCATION MANAGER AND METHOD FOR A MULTI-LIBRARY SYSTEM FOR MULTIPLE HOST CONNECTIONS

[75] Inventors: Robert Lamar Bingham; Kamal Emile Dimitri, both of Tucson, Ariz.

[73] Assignee: International Business Machines Corporation, Armonk, N.Y.

[21] Appl. No.: 08/991,427

[22] Filed: Dec. 16, 1997

[51] Int. Cl.[7] .................................................. G06F 12/00
[52] U.S. Cl. ........................... 369/34; 707/204; 711/4; 711/112; 364/478.02; 395/182.04
[58] Field of Search .................................. 707/204, 206, 707/10; 711/112, 4, 160, 162; 364/478.02; 395/182.04; 369/34

[56] References Cited

U.S. PATENT DOCUMENTS

| | | | |
|---|---|---|---|
| 4,747,047 | 5/1988 | Coogan | 364/200 |
| 4,787,074 | 11/1988 | Deck et al. | 369/36 |
| 4,805,090 | 2/1989 | Coogan | 364/200 |
| 4,932,826 | 6/1990 | Moy et al. | 414/277 |
| 5,214,768 | 5/1993 | Martin et al. | 64/230.6 |
| 5,239,650 | 8/1993 | Hartung et al. | 710/8 |
| 5,274,773 | 12/1993 | Squires et al. | 395/275 |
| 5,289,589 | 2/1994 | Bingham et al. | 710/128 |
| 5,297,067 | 3/1994 | Blackborow et al. | 364/708.1 |
| 5,343,403 | 8/1994 | Beidle et al. | 364/478 |
| 5,362,192 | 11/1994 | Dang | 414/280 |
| 5,377,121 | 12/1994 | Dimitri et al. | 364/478 |
| 5,386,545 | 1/1995 | Gombos, Jr. et al. | 395/575 |
| 5,388,260 | 2/1995 | Monahan et al. | 395/600 |
| 5,418,971 | 5/1995 | Carlson | 395/800 |
| 5,479,581 | 12/1995 | Kleinschnitz | 395/82 |
| 5,607,275 | 3/1997 | Woodruff et al. | 414/331 |
| 5,612,790 | 3/1997 | Sakamoto et al. | 386/69 |
| 5,613,107 | 3/1997 | Villette et al. | 707/201 |
| 5,740,061 | 4/1998 | Dewey et al. | 364/478.02 |
| 5,778,374 | 7/1998 | Dang et al. | 707/101 |
| 5,894,461 | 4/1999 | Fosler et al. | 369/34 |
| 5,914,919 | 6/1999 | Fosler et al. | 369/34 |

Primary Examiner—Jean R. Homere
Attorney, Agent, or Firm—Altera Law Group, LLC

[57] ABSTRACT

A method and apparatus that enables multiple host connections with a multi-library system that allows dynamic tracking of all physical cartridge locations and provides continuous updates, while intercepting move or exchange commands from multiple hosts, converting them to the physical element address locations, and executing the commands. The system having a switching matrix for selectively connecting a plurality of hosts to drives for reading and writing data on data storage media, logic, operatively coupled to switching matrix, for providing a control signal to the switching matrix to connect a first host to a first drive, accessor controller for providing control signals to at least one accessor for instructing the at least one accessor to access data storage media in the library system and to move data storage media between the bins and the drives, and a processor, operatively coupled to the logic and the accessor controller, for controlling the logic and the accessor controller in response to a command from the first host to move a desired data storage media to the first drive and to read and write data on the desired data storage media.

24 Claims, 5 Drawing Sheets

DEVICE ELEMENT ALLOCATION MANAGER AND METHOD FOR A MULTI-LIBRARY SYSTEM FOR MULTIPLE HOST CONNECTIONS

BACKGROUND OF THE INVENTION

1. Field of the Invention

This invention relates in general to multiple library data storage systems, and more particularly to a multiple host data storage system for a multi-library system.

2. Description of Related Art

The implementation of new technology in magnetic tape and optical storage products has meant that the density of data written has increased by orders of magnitude in the last ten or fifteen years. The ability to record high density tapes or optical media, e.g., ten gigabytes or more on one physical volume, has led to reducing costs in physical tape hardware as well as in handling and management resources.

However, over the past five years, data set stacking products, i.e., software solutions to increase tape and optical storage system utilization, have evolved in response to the customer requirement for more efficient ways to manage the information stored thereon. Often a library system is provided in conjunction with a library manger. For example, a virtual tape server (VTS) having a tape library has been proposed to achieve increased capacity. In a VTS, the hardware is transparent to a host and a user. The VTS requires little external management except though the library management element of the tape library into which a VTS is integrated.

In a hierarchical storage systems, such as a VTS, intensively used and frequently accessed data is stored in fast but expensive memory. One example of a fast memory is a direct access storage device (DASD). In contrast, less frequently accessed data is stored in less expensive but slower memory. Examples of slower memory are tape drives and disk drive arrays. The goal of the hierarchy is to obtain moderately priced, high-capacity storage while maintaining high-speed access to the stored information.

In the VTS system, a host interface, a DASD, and a number of tape devices are provided. When the host writes a logical volume, or a file, to the VTS, the data is stored as a file on the DASD. Although the DASD provides quick access to this data, it will eventually reach full capacity and a backup or secondary storage system will be needed. An IBM 3590 tape cartridge is one example of a tape device that could be used as a backup or secondary storage system.

When the DASD fills to a predetermined threshold, the logical volume data for a selected logical volume, typically the oldest, is removed from the DASD to free space for more logical volumes. The selected DASD file is then appended onto a tape cartridge, or a physical volume, with the original left on the DASD for possible cache hits. When a DASD file has been appended to a tape cartridge and the original remains on the DASD, the file is "premigrated".

When the host reads a logical volume from the VTS, a cache hit occurs if the logical volume currently resides on the DASD. If the logical volume is not on the DASD, the storage manager determines which of the physical tape volumes contains the logical volume. The corresponding physical volume is then mounted on one of the tape devices, and the data for the logical volume is transferred back to the DASD from the tape.

Tape servers may use an engine to move data between the DASD and tape drives in a virtual tape server (VTS) environment. For example, the IBM Virtual Tape Server (VTS) uses the IBM Adstar Distributed Storage Manager (ADSM) as its engine to move data between the DASD and IBM 3590 tape drives on the VTS. In such a system, the VTS uses the storage manager client on the DASD, e.g., the ADSM Hierarchical Storage Manager (HSM) client, and a distributed storage manager server attached to the tape drives to provide this function.

A library dataserver provides automated storage for multiple applications such as mid-range computer facilities, LAN servers and archiving applications. To provide high frequency to data, high storage capacity and high performance must be combined. Therefore, knowing the location of data storage media in the library is paramount. Typically, the data storage media are bar-coded with a serial number or other identifying marking. Thus, an accessor that is equipped with a bar-code reader can access any cartridge in the library. In addition, the accessor can mount any cartridge located in the library on any library drive. The accessor's management feature permits rapid scanning of all cartridge bar-codes.

One function of a library dataserver is to provide an update of the locations of data storage media in that library upon resumption of automated operations after the library has been paused and had at least one door opened. Since, while paused, the operator can open any number of doors and move data storage media within the frames of these opened doors, a scan operation must occur to determine which, if any, data storage media have been added, removed, or moved within such frames. Since the location of data storage media within such a library are not known with certainty, any host requests to mount or demount data storage media are held until an inventory update procedure has completed. Once the library system inventory has been updated, data storage media may be accessed by a host.

However, to connect multiple hosts to a multi-library system, additional hardware, such as extra adapters and cables, is required. Still, there are several disadvantages to a multiple host system that is configured using multiple adapters and cabling. For example, data access is slowed due to the involvement of multiple adapters and the accompanying congestion.

It can be seen that there is a need for a method and apparatus that enables multiple host connections with a multi-library system without the traditional drawbacks.

It can also be seen that there is a need for a method and apparatus that allows dynamic tracking of all physical cartridge locations and provides continuous updates.

It can also be seen that there is a need for a method and apparatus that intercepts move or exchange commands from multiple hosts, converts them to the physical element address locations, and then executes the commands.

SUMMARY OF THE INVENTION

To overcome the limitations in the prior art described above, and to overcome other limitations that will become apparent upon reading and understanding the present specification, the present invention discloses a multiple host data storage system for a multi-library system.

The present invention solves the above-described problems by providing a method and apparatus that enables multiple host connections with a library system without the traditional drawbacks. The method and apparatus allows dynamic tracking of all physical cartridge locations and provides continuous updates. The method and apparatus also intercepts move or exchange commands from multiple hosts, converts them to the physical element address locations, and then executes the commands.

A system in accordance with the principles of the present invention includes a switching matrix for selectively connecting a plurality of hosts to drives for reading and writing data on data storage media, logic, operatively coupled to switching matrix, for providing a control signal to the switching matrix to connect a first host to a first drive, accessor controller for providing control signals to at least one accessor for instructing the at least one accessor to access data storage media in the library system and to move data storage media between the bins and the drives, and a processor, operatively coupled to the logic and the accessor controller, for controlling the logic and the accessor controller in response to a command from the first host to move a desired data storage media to the first drive and to read and write data on the desired data storage media.

Other embodiments of a system in accordance with the principles of the invention may include alternative or optional additional aspects. One such aspect of the present invention is that the processor intercepts the commands from the hosts, converts the commands to the physical element address locations of data storage media, and executes the commands.

Another aspect of the present invention is that the host ports are included for interfacing with the plurality of hosts and receiving commands from the hosts for accessing data storage media located in bins of the library system.

Another aspect of the present invention is that the host ports are SCSI ports.

Another aspect of the present invention is that the processor is coupled to the host ports, the logic and the accessor controller via an internal bus.

Another aspect of the present invention is that memory may be coupled to the internal bus.

Another aspect of the present invention is that the switching matrix further comprises a plurality of buses, the plurality of buses comprising a bus associated with each host, a plurality of switches, the plurality of switches being coupled to the buses, each switch being coupled to a drive, and a plurality of selection signal lines, the plurality of selection signal lines commanding each switch to connect a host on a bus to a drive.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method and apparatus that enables multiple host connections with a library system without the traditional drawbacks. The present invention allows dynamic tracking of all physical cartridge locations and provides continuous updates, while intercepting move or exchange commands from multiple hosts, converting them to the physical element address locations, and executing the commands. While an example of a tape library system is described, those skilled in the art will recognize that other storage media such as optical systems may be used.

Figure 1:
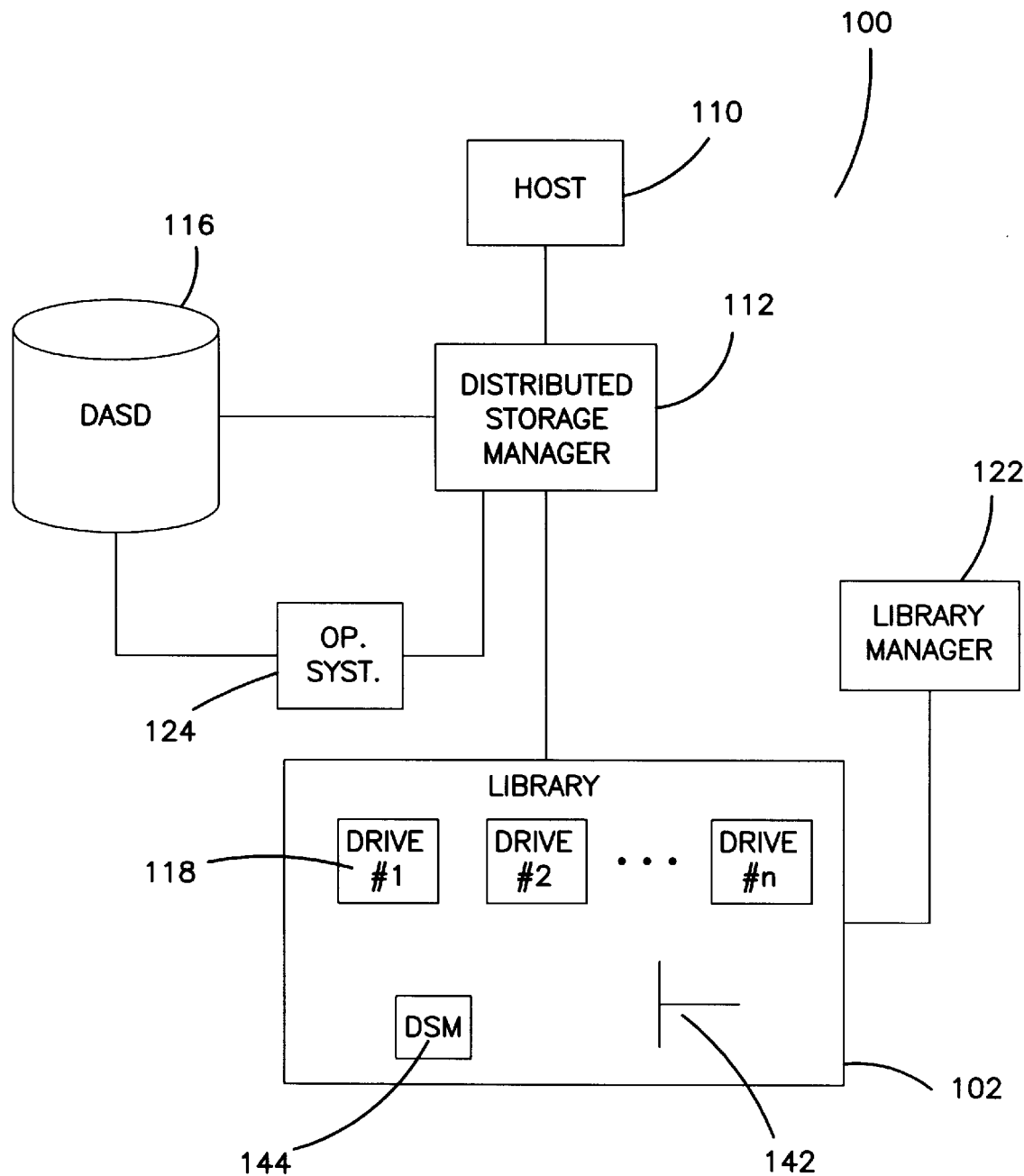
FIG. 1 illustrates a single host tape server system according to the prior art.

FIG. 1 illustrates a single host tape server system 100 according to the prior art. The single host system 100 typically includes a host computer 110, a distributed storage manager 112, and DASD cache 116. An automated data storage library 102 is provided and includes a plurality of tape drives 118. A library manager 122 controls the automated data storage library 102. The single host system 100 also includes an operating system 124.

In the single host tape server system 100, intensively used and frequently accessed data is stored in fast but expensive memory, such as direct access storage devices (DASD) 116. In contrast, less frequently accessed data is stored in less expensive but slower memory, such as tape drives 118.

A single host tape server system 100 uses an engine 112 to move data between the DASD 116 and tape drives 118. For example, the IBM Virtual Tape Server (VTS) uses the IBM Adstar Distributed Storage Manager (ADSM) as its engine to move data between the DASD and IBM 3590 tape drives on the single host tape server system. The library manager 122, via commands from the distributed storage manager 112 controls an accessor 142 which accesses individual tapes 144.

The distributed storage manager 112 is a client/server hierarchical storage manager that may be used for a broad range of applications. As such, the distributed storage manager 112 often has a downlevel list of which files have a recent copy on one of the tapes 144.

Figure 2:
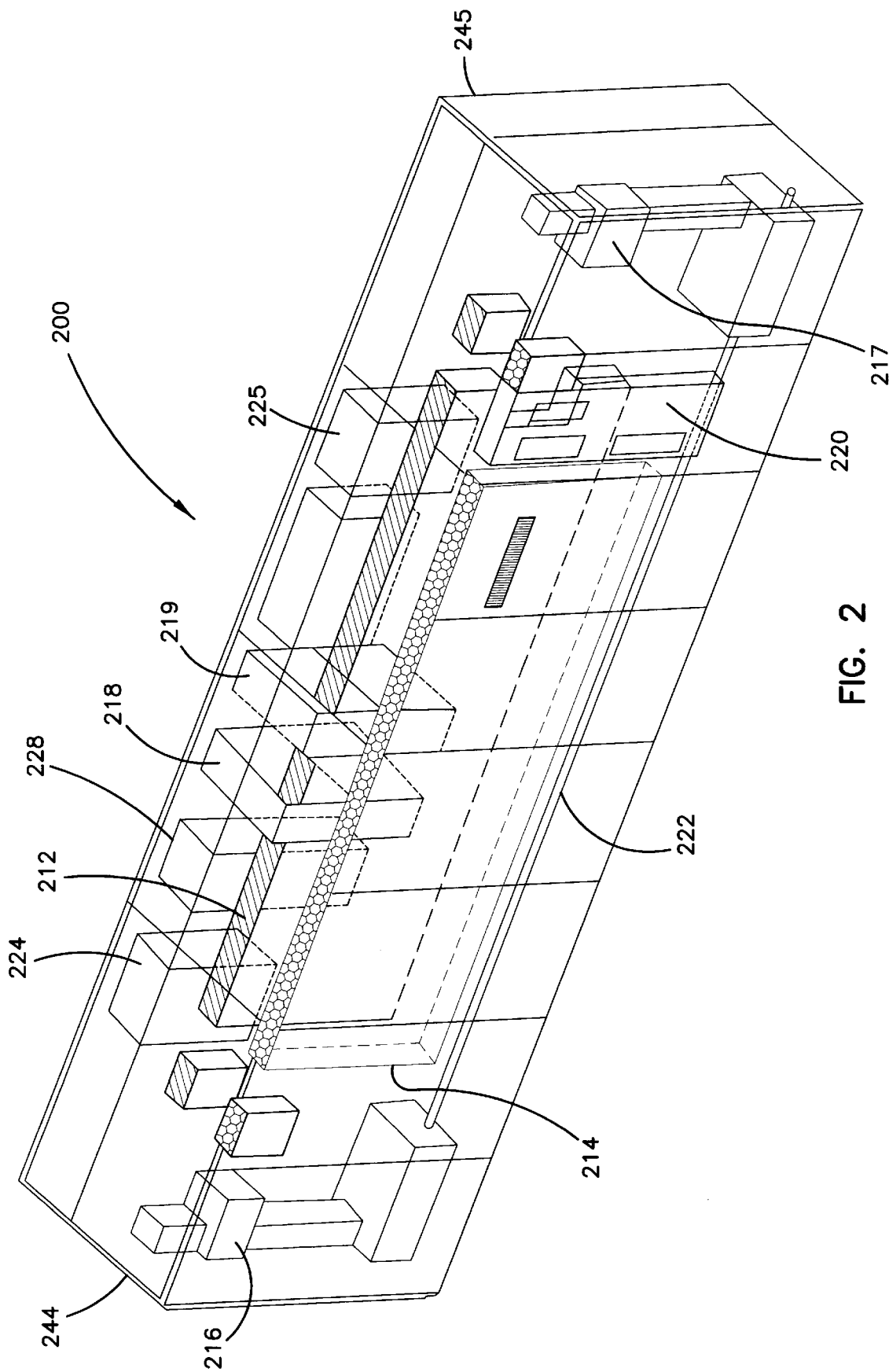
FIG. 2 illustrates one example of an automated data storage library.

FIG. 2 illustrates one example of an automated data storage library 200 having an inner "wall" of storage slots 212 and an outer wall of storage slots 214, which store data storage media. Typically, the data storage media are self-contained within a portable container, or cartridge. Examples of such data storage media include magnetic tape cartridges or cassettes, optical disk cartridges of various types, including ROM, WORM and rewritable, and in various formats. For universal reference to any of these types of media, the terms "data storage media' or 'media' are used herein.

In addition, the library of the present invention may be a multi-accessor library as illustrated in FIG. 2 having at least two accessors 216 and 217. An accessor is a robotic device which accesses the data storage media from the storage slots and delivers the accessed media to data storage drives 218 and 219 for reading and/or writing data on the accessed media and returns the media to storage slots 212 and 214. A media import/export port or station, 220 is provided for insertion or retrieval of data storage media into or out of the library. The accessors 216 and 217 run on a rail 222 in an aisle between the inner wall of storage slots 212 and the outer wall of storage slots 214.

In the illustrated embodiment, multiple library managers 224 and 225 are provided to manage the positioning and access of the accessors 216 and 217 to transport data storage media between storage slots 212 and 214, import/export port 220 and data storage drives 218 and 219.

An operator input station 228 is provided for allowing an operator to communicate with the automated data storage library. The accessors run on the rails 222 along the library aisle by motors (not shown). An example of an automated data storage library 210 is the IBM 3494 Data Storage Library, which stores magnetic tape cartridges.

Typically, the library manager 224 or 225 comprises a data processor and suitable data memory and data storage capability to control the operation of the library 210. Specifically, the library manager 224 or 225 controls the actions of the robot accessors 216 and 217. The conventional library manager 224 or 225 is interconnected through a provided interface to a host processor (not shown), which provides commands requesting access to particular data storage media or to media in particular storage slots, commands for access to data or to locations on the data storage media and information to be recorded on, or to be read from. Selected data storage media are typically transmitted directly between the drives 218, 219 and a host. The library manager 224 or 225 is typically provided with a database, which includes tables and programs. Examples of library managers 224 and 225 are an IBM personal computer or IBM RS/6000 processor.

Library manager 224 is associated with accessor 216 and library manager 225 is associated with accessor 217. The library manager 224 and associated accessor 216 may be located at one end of the library aisle and designated the "A" library manager and "A" accessor. Similarly, the library manager 225 and associated accessor 217 are at the opposite end of the library aisle and designated the "B" library manager and "B" accessor. The accessor 216 is called the "local" accessor with respect to library manager 224. The accessor 217 is called the "remote" accessor with respect to library manager 224. Similarly, accessor 217 is called the "local" accessor and accessor 216 is called the "remote" accessor with respect to library manager 225.

The present invention may be utilized with a single library manager, or with the illustrated multiple library managers. In accordance with the present invention, one of the accessors is designated as the "active" accessor. In one embodiment, only the active accessor has authorization to be in the aisle and handles all of the operations of the library. This sole authorization may also be called "full aisle mode". In a dual accessor library, in full aisle mode the accessor that is not servicing aisle requests, is the "standby" accessor. If the standby accessor is capable of performing the functions of an active accessor, it is considered to be 'available in "hot standby mode". If the standby accessor is not capable of performing the functions of an active accessor, it is considered to be "unavailable". In FIG. 2, the standby assessor is moved to the end of the library 244 or 245 and out of the aisle. The ends 244 and 245 of the library are called "service" or "standby" areas.

Nevertheless, previous storage managers could not connect multiple hosts to a multi-library system so that each host has access to all elements in all the libraries without additional hardware including extra adapters and cables and/or without degrading performance. A device allocation manger is required to provide a multi-library system the ability to support a multiple host environment.

Figure 3:
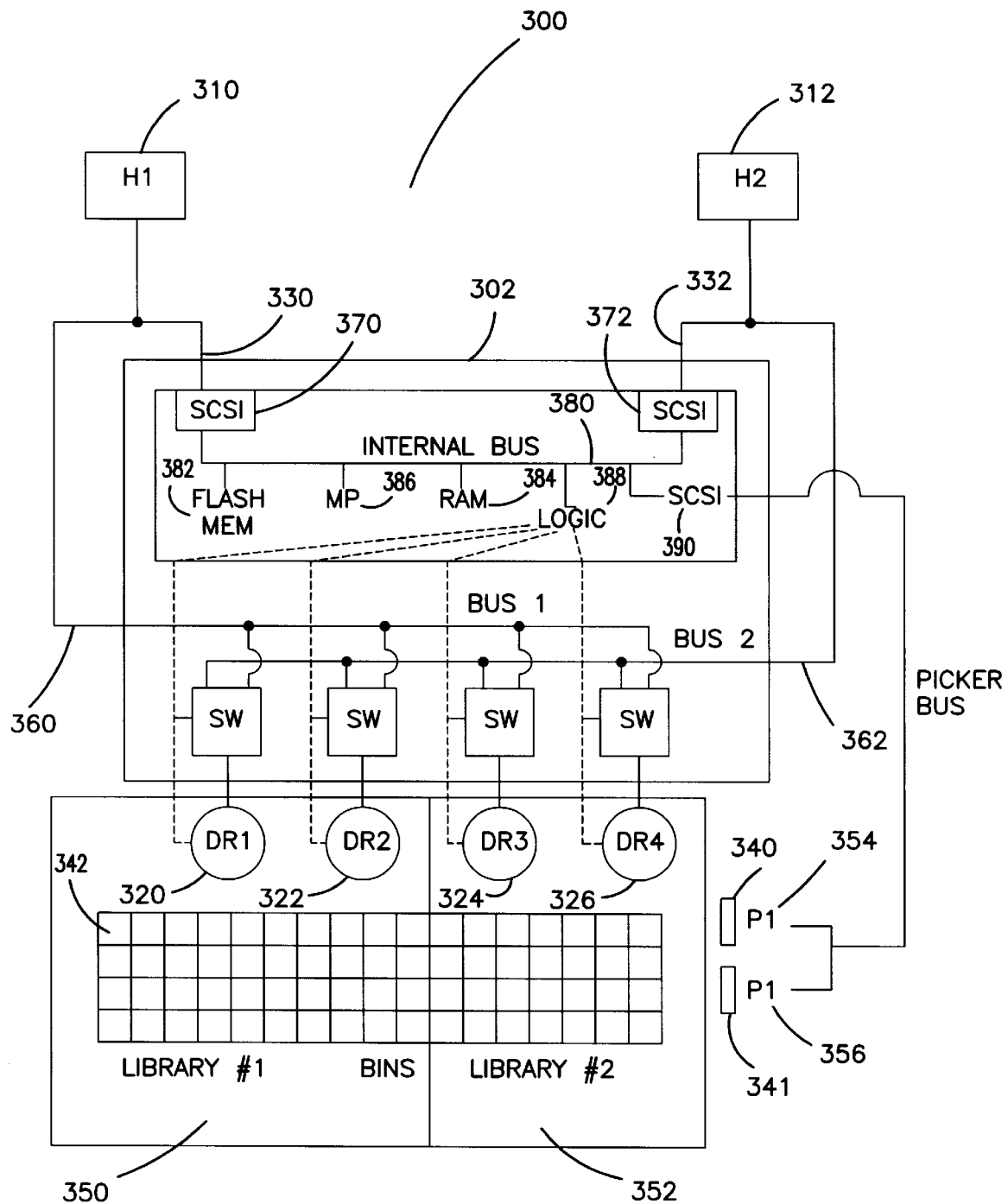
FIG. 3 illustrates a multiple host system that uses a device allocation manager according to the present invention.

FIG. 3 illustrates a multiple host system 300 that uses a device allocation manager 302 according to the present invention. The device allocation manager 302 provides connections for at least two hosts 310, 312 and multiple storage drives 320, 322, 324, 326. For this purpose, the hosts connections 330, 332 to the device allocation manager can be Fiber Channel, Small Computer System Interface (SCSI), or Serial Storage Architecture (SSA). The device elements connection may be SCSI or SSA. Data storage media 340, 341 are stored in bins 342 in a first 350 and second 352 data library. Accessors 354, 356 have access to all the bins 342 and all the drives 320, 322, 324, 326. The device allocation manager 302 switches buses 360, 362 between hosts 310, 312 and drives 320, 322, 324, 326 for data access.

During read or write operations, hosts 310, 312 are connected physically to drives 320, 322, 324, 326. The allocation manager 302 will control a queue containing commands from several hosts. Each host 310, 312 has a virtual accessor address and a virtual drive address and each host 310, 312 has access to all virtual accessor addresses and a virtual drive address. The allocation manager 302 may change the virtual address of the drives 320, 322, 324, 326 using the direct signal wires 328. Further, each host has access to all of the bins 342 where data storage media 340, 341 such as cartridges and disks reside, and each host 310, 312 has its own inventory table or map of where each data storage media 340, 341 is located. Inventory tables or maps are updated according to the results of the last inventory performed by that host. This inventory map is different than the physical storage element that is dynamically updated in the device allocation manager.

The host connections 330, 332 are made via protocol circuits 370, 372. Through the host connection ports 330, 332, hosts 310, 312 link with the internal bus 380 of the device allocation manager 300. The internal bus 380 provides connections to memory 382, 384, a processor 386, the accessor bus 388 and logic 390 for connecting hosts 310, 312 to a specific drive 320, 322, 324, 326. The internal logic 388 controls switches 392 that dynamically connect multiple hosts 310, 312 through multiple buses 360, 362 to specific devices 320, 322, 324, 326. Thus, the device allocation manager 302 does not need to remove a drive, but rather may switch the buses 360, 362 to connect a host to a free drive.

After a read/write operation, a drive may be demounted. However, the processor 386 must know which drives 320, 322, 324, 326 are available, or which are in the pool of free drives. The processor 386 identifies the free drive by scanning a demount queue (not shown) for available drives. Therefore, before a demount of a drive occurs, the processor 386 checks to determine whether another host is requesting the drive. If the free drive is being requested by a host, the processor 386 modifies an address of the free drive to match an address associated with the command from the host.

Commonly owned U.S. Pat. No. 5,289,589, herein incorporated by reference, describes a SCSI switch that may be used for connecting hosts to specific devices. The device allocation device 300 also selects an accessor 354, 356 for selecting data storage media after the location translation process has been performed to identified the physical location of the data storage media in the bins 342.

Figure 4:
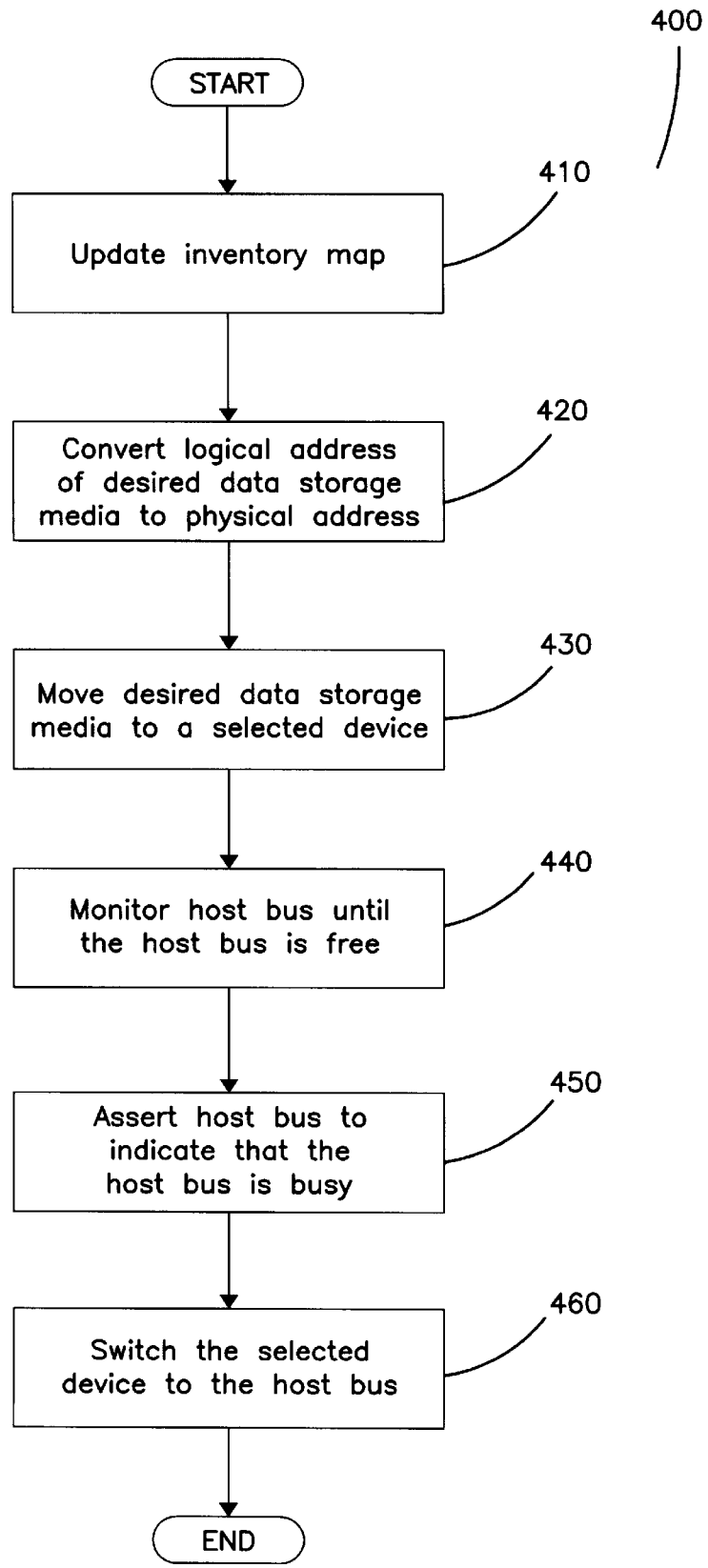
FIG. 4 illustrates a flow chart of the command processing by the device allocation manager.

FIG. 4 illustrates a flow chart 400 of the command processing by the device allocation manager. Inventory maps are updated 410 and then the device allocation manager makes the translation from where each host thinks that a particular cartridge is and where it is physically. The device allocation manager then translates the command coming from the host to the real addresses. Thus, the translation process is transparent to the host since the device allocation manager translates from the logical location to the physical location, i.e., inventory map, by converting the logical table from each host command to the physical table 420.

To ensure that each host has access to all elements in all the libraries, the device allocation manager communicates between the hosts and the accessors. The device allocation manager optimizes all move and exchange commands and reconfigures drive addresses for fast access to data between hosts and drive.

Once the logical address of desired data storage media has been translated to a physical address, the desired data storage media is moved to a selected device 430. Then the queuing algorithm of the device allocation manager connects a host to the selected device. When the host wants to put a device on BUS 1, the device allocation manager will monitor BUS 1 until BUS 1 becomes free 440, asserts BUS 1 as busy 450, and then switches the device on BUS 1 460. This process is reversed when a device needs to go off BUS 1. This method allows the dynamic switching of a device to a bus or dropping of a device off a bus. To drop a device off a bus, the address coming from the host is intercepted and changed to the drive address that will be performing the write or read operation. Alternatively, the capability of changing the address on the fly can be built into the drive.

Referring again to FIG. 3, an example of the invention will be described. A first host 310 has a first cartridge 340 mounted in a first physical drive 320 having address ID#1, and a second host 312 has a second cartridge 342 mounted in a second physical drive 322 having address ID#1. The third drive 324 is connected to the first host 310 and has an address of ID#2. The fourth physical drive 326 is not connected to any hosts. Thus, the fourth physical drive 326 is in a "free pool" of drive resources.

The allocation manager 302 receives accessor move requests from both hosts 310, 312. The accessor move requests are put in a queue. One request may be to demount a first cartridge 340 (not shown in the first drive) from the first physical drive 320, and the other request may be to mount the first cartridge 340 for the second host 312 in the first drive 320 by giving the first drive address ID#2.

To accomplish this, the allocation manager 302 detects the completion of the first drive 320/first host 310 association because of a demount request. The allocation manager 302 then sends a demount completion to the first host 310, without effectively removing the cartridge 340 from the first drive 320. The allocation manager 302 changes the address of the first physical drive 320 to ID#2, using the direct signal wires 328. The allocation manger 302 then waits for the first bus 360 previously associated with the first host 310 to get free, assigns the first bus 360 to a busy state, and switch the first drive 320 off of the first bus 360 and then sets the first bus 360 free. The allocation manager 302 then does the same operation for the second bus 362. The allocation manager 302 waits for the second bus 362 to become free, assigns the second bus 362 to a busy state, switches on the first drive 320 having ID#2 to the second bus 362, and then sends a response to the second host 312 that the mount command is completed successfully.

Accordingly, the present invention allows switching to occur in milliseconds versus several seconds, as required by mount/demounts, thus achieving fast data access to host. Other benefits are that all hosts can access all drives, and that each drive has its own unique virtual address, so that when one host dies, the other host will take over the entire libraries, thus achieving reliability. Bus bandwidth is maintained by having each host on an independent SCSI bus, connected to only the required drives for that instance, i.e., when needed to be connected, in order to perform the read/write operation. In other applications, where there is a single library with multiple accessors, the fast time to data in improved by having the allocation manager selecting the closest drive to the closest accessor and bin, for shorter mount distance.

Figure 5:
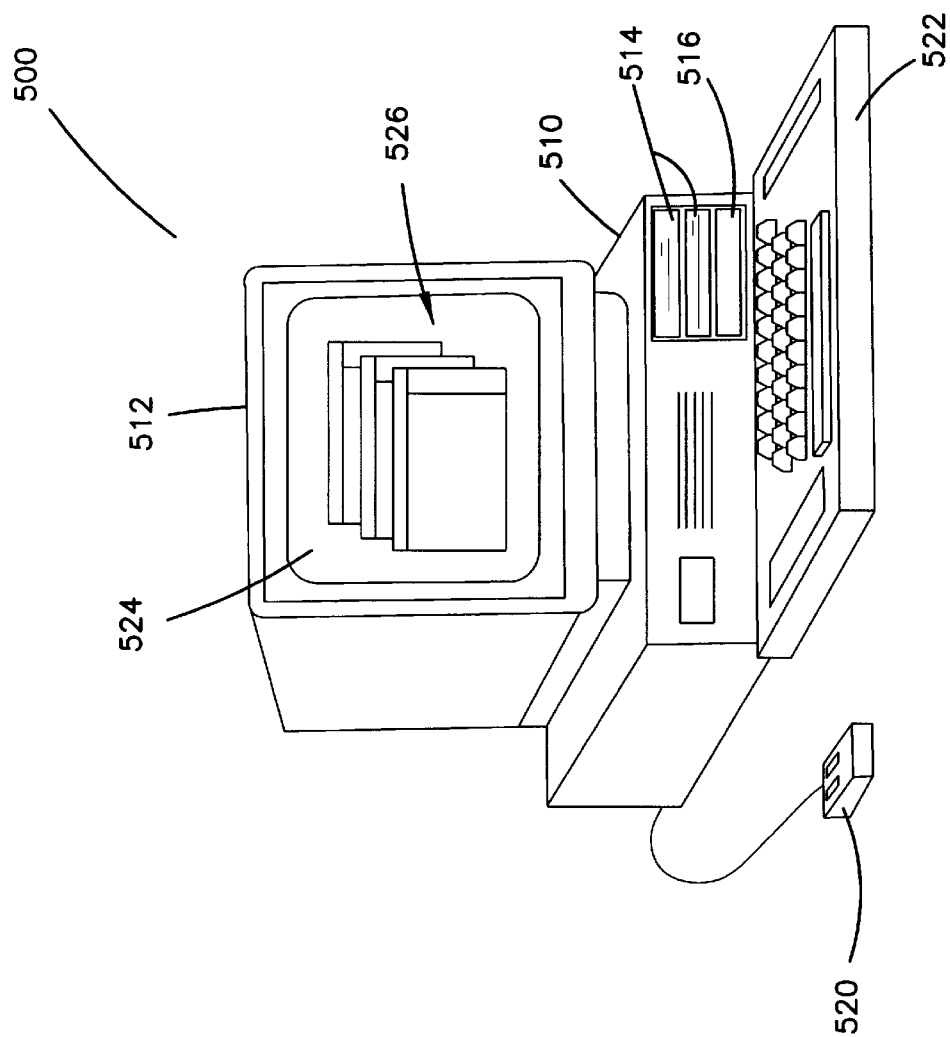
FIG. 5 is a block diagram illustrating an exemplary hardware environment for connecting multiple hosts to multiple data libraries according to the present invention.

FIG. 5 is a block diagram 500 that illustrates an exemplary hardware environment for connecting multiple hosts to multiple data libraries according to the present invention. The present invention is typically implemented using a computer 510 comprised of a microprocessor, random access memory (RAM), read-only memory (ROM), and other components. It is envisioned that attached to the computer 510 may be a monitor 512, floppy disk drives 514, and CD-ROM drives 516. Also included in the preferred embodiment may be input devices, for example, a mouse pointing device 520 and a keyboard 522.

The computer 510 operates under the control of an operating system 524, such as the Windows, OS/2, Macintosh, or UNIX operating systems, which is represented in FIG. 5 by the screen display on the monitor 512. The computer 510 executes one or more computer programs 526, which are represented in FIG. 5 by the "windows" displayed on the monitor 512, under the control of the operating system 524. The present invention comprises a device allocation manager that is preferably implemented in the operating system 524 and/or computer programs 526.

Generally, the operating system 524 and the computer programs 526 may be tangibly embodied in a computer-readable medium or carrier, e.g. one or more of the fixed and/or removable data storage devices 514 and 516, or other data storage or data communications devices. Both the operating system 524 and the computer programs 526 may be loaded from the data storage devices 514 and 516 into the random access memory of the computer 510 for execution by the microprocessor as discussed above with reference to FIG. 4. Both the operating system 524 and the computer programs 526 comprise instructions which, when read and executed by the microprocessor of the computer 510, causes the computer 510 to perform the steps necessary to execute the steps or elements of the present invention.

Although an exemplary computer system configuration is illustrated in FIG. 5, those skilled in the art will recognize that any number of different configurations performing similar functions may be used in accordance with the present invention.

Accordingly, the multiple host system using a device allocation manager of the present invention uses fewer slots in hosts, hence fewer adapters. In addition, fewer cable congestions and connections occur as a result of using the device allocation manager. Less accessor travel is facilitated by optimizing and queuing mounts and dismounts through the device allocation manager. Furthermore, faster access of data to hosts is provided in some instances by reconfiguring device addresses and bus switching. Also, the device allocation manager mixes library types to a single bus in a host by switching drives buses.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A device allocation manager for connecting multiple host to a multi-library system, comprising:

a switching matrix for selectively connecting two or more hosts of a set of hosts separately and concurrently to two or more drives of a set of drives for transferring data between the set of hosts and data storage media coupled to the set of drives;

logic, operatively coupled to switching matrix, for providing a control signal to the switching matrix to connect a first host of the set of host to a free drive of the set of drives; and a processor, operatively coupled to the logic, for controlling the logic in response to a command from the first host to transfer data between the free drive and the first host.

2. The device allocation manager of claim 1 wherein an address of the free drive is modified to match an address associated with the command from the host.

3. The device allocation manager of claim 1 wherein the processor identifies the free drive by scanning a demount queue for available drives.

4. The device allocation manager of claim 1 further comprising accessor controller for providing control signals to at least one accessor for instructing the at least one accessor to access data storage media in the library system and to move data storage media between the bins and the drives.

5. The device allocation manager of claim 1 wherein the processor intercepts the commands from the hosts, converts the commands to the physical element address locations of drives, and executes the commands.

6. The device allocation manager of claim 1 further comprising host ports for interfacing with the plurality of hosts and receiving commands from the hosts for accessing data storage media located in bins of the library system.

7. The device allocation manager of claim 6 wherein the host ports are SCSI ports.

8. The device allocation manager of claim 6 wherein the processor is coupled to the host ports and the logic via an internal bus.

9. The device allocation manager of claim 8 further comprising memory coupled to the internal bus.

10. The device allocation manager of claim 1 wherein the switching matrix further comprises:

a plurality of buses, the plurality of buses comprising a bus associated with each host;

a plurality of switches, the plurality of switches being coupled to the buses, each switch being coupled to at least one drive; and a plurality of selection signal lines, the plurality of selection signal lines commanding each switch to connect the host on a bus to the free drive.

11. A method for connecting multiple host to a data library, comprising the steps of:

selectively connecting two or more hosts of a set of hosts separately and concurrently to two or more drives of a set of drives for transferring data between the set of host and the set of drives;

in response to a command from a first host of the set of host providing a control signal to connect the first host to a free drive of the set of drives;

converting the command from the first host to a physical location of a desired data storage media; and executing the command to transfer data between the free drive and the first host.

12. The method of claim 11 wherein the step of converting commands further comprises the step of modifying an address of the free drive to match an address associated with the command from the first host.

13. The method of claim 12 the step of modifying an address of the free drive further comprises the step of identifying the free drive by scanning a demount queue for available drives.

14. The method of claim 11 wherein the step of converting the commands further comprises translating a logical location of the desired data storage media known to the first host to a physical location of the data storage media in the library system.

15. The method of claim 11 wherein the step of executing the command further comprises the step of using the physical location of the desired data storage media to control an accessor to move the desired data storage media to the free drive for reading and writing data on the desired data storage media.

16. The method of claim 15 wherein the step of selectively connecting any of a plurality of host to any of a plurality of drives further comprising the steps of:

monitor a bus until the bus becomes free;

asserting the bus to indicate the bus is busy; and switching a free drive to the bus.

17. The method of claim 11 further comprising the steps of optimizing commands and reconfiguring drive addresses for fast access to data between hosts and drives.

18. An article of manufacture for a computer-based user-interface, the article of manufacture comprising a computer readable medium having instructions for causing a computer to perform automated reconcile of a server and client database in a virtual tape server, the method comprising the steps of:

selectively connecting two or more hosts of a set of hosts separately and concurrently to two or more drives of a set of drives for transferring data between the set of host and the set of drives;

in response to a command from a first host of the set of host providing a control signal to connect the first host to a free drive of the set of drives;

converting the command from the first host to a physical location of a desired data storage media; and executing the command to transfer data between the free drive and the first host.

19. The article of manufacture of claim 18 wherein the step of converting commands further comprises the step of modifying an address of the free drive to match an address associated with the command from the first host.

20. The article of manufacture of claim 19 the step of modifying an address of the free drive further comprises the step of identifying the free drive by scanning a demount queue for available drives.

21. The article of manufacture of claim 18 wherein the step of converting the commands further comprises translating a logical location of the desired data storage media known to the first host to a physical location of the data storage media in the library system.

22. The article of manufacture of claim 18 wherein the step of executing the command further comprises the step of using the physical location of the desired data storage media to control an accessor to move the desired data storage media to the free drive for reading and writing data on the desired data storage media.

23. The article of manufacture of claim 22 wherein the step of selectively connecting any of a plurality of host to any of a plurality of drives further comprising the steps of:
   monitor a bus until the bus becomes free;
   asserting the bus to indicate the bus is busy; and
   switching a free drive to the bus.

24. The article of manufacture of claim 18 further comprising the steps of optimizing commands and reconfiguring drive addresses for fast access to data between hosts and drives.

* * * * *

UNITED STATES PATENT AND TRADEMARK OFFICE
CERTIFICATE OF CORRECTION

PATENT NO. : 6,052,341

DATED : April 18, 2000

INVENTOR(S) : Bingham et al.

It is certified that error appears in the above-identified patent and that said Letters Patent are hereby corrected as shown below:

Abstract, line 2, delete "that" and insert -- without the traditional drawbacks. The present invention --
Abstract, line 7, delete "system having" and insert -- invention includes--

Signed and Sealed this

Seventeenth Day of April, 2001

*Attest:*

NICHOLAS P. GODICI

*Attesting Officer*     Acting Director of the United States Patent and Trademark Office